(12) United States Patent
Wei et al.

(10) Patent No.: US 6,608,689 B1
(45) Date of Patent: Aug. 19, 2003

(54) COMBINATION THIN-FILM STRESS AND THICKNESS MEASUREMENT DEVICE

(75) Inventors: Lanhua Wei, Fremont, CA (US); Jon Opsal, Livermore, CA (US); Allan Rosencwaig, Danville, CA (US)

(73) Assignee: Therma-Wave, Inc., Fremont, CA (US)

(*) Notice: Subject to any disclaimer, the term of this patent is extended or adjusted under 35 U.S.C. 154(b) by 0 days.

(21) Appl. No.: 09/384,474

(22) Filed: Aug. 27, 1999

Related U.S. Application Data

(60) Provisional application No. 60/103,084, filed on Oct. 5, 1998, provisional application No. 60/098,485, filed on Aug. 31, 1998, and provisional application No. 60/098,420, filed on Aug. 31, 1998.

(51) Int. Cl.[7] .......................... G01B 11/28; G01N 21/86
(52) U.S. Cl. .................. 356/630; 356/364; 250/559.27
(58) Field of Search ............................. 356/630, 364, 356/445; 250/559.29

(56) References Cited

U.S. PATENT DOCUMENTS

| | | | |
|---|---|---|---|
| 5,134,303 A | 7/1992 | Blech et al. | 250/560 |
| 5,227,641 A | 7/1993 | Cheng | 250/561 |
| 5,232,547 A | 8/1993 | Drowley et al. | 156/601 |
| 5,248,889 A | 9/1993 | Blech et al. | 250/561 |
| 5,582,485 A * | 12/1996 | Lesniak | 374/5 |
| 5,779,797 A | 7/1998 | Kitano | 118/500 |
| 5,877,859 A | 3/1999 | Aspnes et al. | 356/364 |
| 5,959,735 A * | 9/1999 | Maris et al. | 356/632 |
| 6,069,703 A * | 5/2000 | Banet et al. | 356/432 |
| 6,188,838 B1 | 2/2001 | Mikata et al. | 392/418 |

FOREIGN PATENT DOCUMENTS

| | | | |
|---|---|---|---|
| DE | 197 12 556 A1 | 3/1997 | .......... H01L/21/68 |
| DE | 19712556 A1 | 11/1997 | .................. 21/68 |
| EP | 58241536 | 12/1983 | .......... G01M/11/00 |
| JP | 4-98236 | 8/1990 | .......... G03B/19/12 |
| JP | 4-98236 | 3/1992 | .................. 19/12 |
| JP | 10-92759 | 9/1996 | .......... H01L/21/22 |
| JP | 10-92759 | 4/1998 | .................. 21/22 |
| WO | PCT/US98/02645 | 2/1998 | .......... G01B/11/00 |
| WO | WO 99/02970 | 1/1999 | |

OTHER PUBLICATIONS

A.K. Sinha et al., "Thermal stresses and cracking resistance of dielectric films (SiN, $SI_3N_4$, and $SiO_2$) on Si substrates," *J. Appl. Phys.*, vol. 49, No. 4, Apr. 1978, pp. 2423–2426.

* cited by examiner

*Primary Examiner*—Frank G. Font
*Assistant Examiner*—Roy M. Punnoose
(74) *Attorney, Agent, or Firm*—Stallman & Pollock LLP

(57) ABSTRACT

A composite metrology tool, measures basic optical parameters of thin films (e.g., thickness, index of refraction, and birefringence) and stress (e.g., wafer displacements, such as bow and warp). These measurements are combined (e.g. in a processor) using optimization techniques to yield accurate overall information of the wafer parameters.

13 Claims, 8 Drawing Sheets

TOO CLOSE TO CENTER

TOO CLOSE TO EDGE

2/3 FROM CENTER

COMBINATION THIN-FILM STRESS AND THICKNESS MEASUREMENT DEVICE

RELATED APPLICATIONS

This application claims priority to provisional application No. 60/098,485 filed Aug. 31, 1998; to provisional application No. 60/103,084 filed Oct. 5, 1998; and to provisional application No. 60/098,420 filed Aug. 31, 1998—all of which are incorporated herein by reference in their entirety.

TECHNICAL FIELD

The present invention relates to measuring stress and thin film parameters and, in particular, to a method and apparatus that combines initial stress and thickness measurements and optimizes the calculations for both.

BACKGROUND

There are a number of conventional metrology tools for measuring the characteristics of thin films on semiconductor wafers. Typical parameters of interest are the thickness (t), index of refraction (n), and extinction coefficient (k). The conventional tools employ a variety of approaches for measuring these parameters, including spectrophotometry and ellipsometry. The most advanced and complex tools actually combine a number of these approaches to measure these parameters.

During the fabrication of wafers, thin films are deposited on the wafer. These thin films are typically formed from dielectric or metallic materials. The deposition process often produces residual stresses in the wafer. These stresses can affect the device manufacture and performance. Accordingly, there is an interest in measuring the stress after such a deposition as a means of monitoring or controlling the manufacturing process.

One way to measure stress is to measure the deflection (bow or warp) of the stressed wafer. Typically, one measures the wafer both before and after the stress-inducing manufacturing step. Knowing the wafer thickness, size, stiffness and thickness of the thin film, one can calculate the residual stress from the change in shape. There is already at least one tool on the market which performs stress measurements in this way. Descriptions of this tool can be found in U.S. Pat. Nos. 5,134,303 and 5,248,889, incorporated herein by reference.

Briefly, devices of the type described in the above-cited patents operate by directing a probe beam onto the surface of the wafer. A position sensitive photodetector is then used to measure the location of the reflected probe beam. During calibration, the central portion of the position sensitive photodetector is arranged to coincide with the location where the reflected probe beam would fall (based on Snell's Law) if the wafer surface was flat. Any bow or tilt in the wafer surface will change the direction of the beam, causing a displacement of the reflected probe beam on the photodetector. The amount and direction of the displacement of the reflected probe beam on the detector provides a measure of the direction and extent of the bow or warp of the wafer.

As noted above, in order to determine the amount of stress based on the measurement of wafer warp, other parameters of the wafer, including wafer size, stiffness and the thickness of the thin film must be known. In the prior systems, a value for thickness used in determining the stress value is selected based on the presumed or desired thickness of the film. However, if the thickness presumption is in error, the calculation of stress based on the measurement of the curvature of the wafer will be inaccurate.

Accordingly, it would be preferable to obtain an accurate measurement of the film thickness before calculating the stress levels in the film. Unfortunately, just as the stress calculation is dependent on the film thickness, conversely, the measurement of the thickness of the film is dependent on the level of stress in the film. For example, stresses in the film can directly affect the index of refraction of the material. While the coefficient of stress induced index change is typically small, the large stresses induced in films during the deposition process (approaching a billion Pascals) can lead to index changes as large as even a few tenths of a percent. If such changes occur and are not accounted for in analysis of the data on thin film measurement, relatively large errors will arise in the computation of thickness and extinction coefficients. As noted above, if the thickness of the film cannot be accurately determined, a determination of the stress cannot be accurately obtained since the level of measured warp can only be accurately converted into stress measurements if the thickness of the thin film is accurately known.

Another parameter which is of interest to semiconductor manufacturers is the birefringent effects of certain films. Many films, such as paralyne, have a natural birefringence. These films (as well as other films) also generate birefringence under stress. It is desired to have a system which distinguishes between the inherent birefringence and the birefringence effect due to stress in the films.

SUMMARY

The subject invention which utilizes a composite metrology tool, which measures the basic parameters of thin films (e.g., t, n and k and birefringence) and wafer displacements. These measurements are combined (e.g. in a processor) using optimization techniques to yield accurate overall information of the wafer parameters.

BRIEF DESCRIPTION OF FIGURES

FIG. 5a illustrates the tilt detection system calibration factors determined using the system of FIGS. 4a and 4b, while

DETAILED DESCRIPTION

In one embodiment, the subject system is implemented in a tool of the type described in published PCT application WO 99/02970 (published Jan. 21, 1999 and claiming priority from U.S. patent application Ser. No. 09/015,839, filed Jan. 29, 1998) entitled "AN APPARATUS FOR ANALYZING MULTI-LAYER THIN FILM STACKS ON SEMICONDUCTORS" and incorporated herein by reference in its entirety. As described therein, this tool includes multiple measurement systems, including a spectrophotometer, spectroscopic ellipsometer, as well as some multiple angle of incidence measurement devices. The outputs from each of the measurement modules are can be combined using appropriate algorithms to more accurately and less ambiguously analyze the thin film parameters. An embodiment of the tool described in published PCT application WO 99/02970 is shown in FIG. 1.

Figure 1:
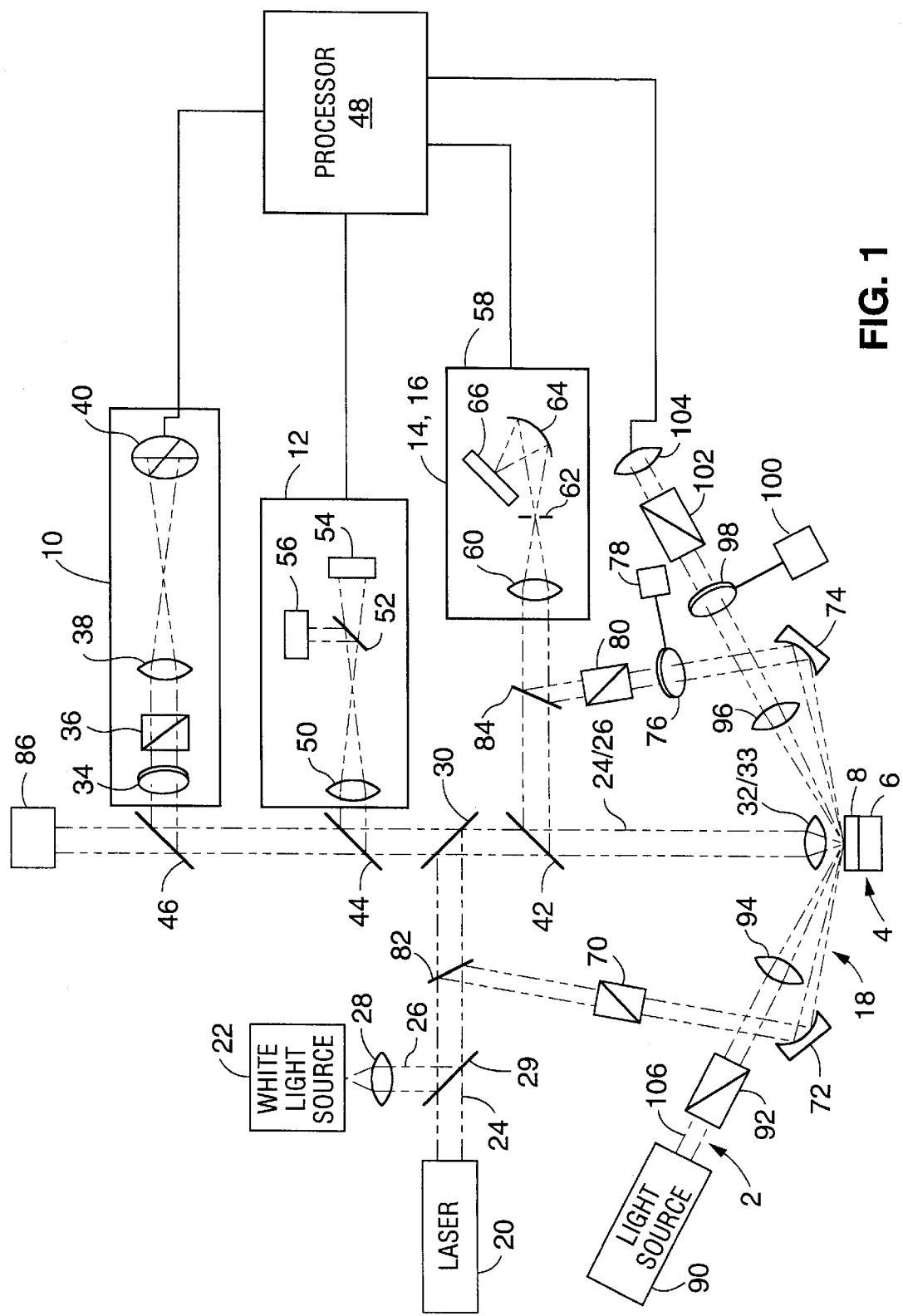
FIG. 1 illustrates a composite optical measurement system in which the present invention may be embodied.

Briefly, the FIG. 1 apparatus is a composite optical measurement system 1 that which includes five different non-contact optical measurement devices and the reference ellipsometer 2 of the present invention. Composite optical measurement system 1 includes a Beam Profile Ellipsometer (BPE) 10, a Beam Profile Reflectometer (BPR) 12, a Broadband Reflective Spectrometer (BRS) 14, a Deep Ultra Violet Reflective Spectrometer (DUV) 16, and a Broadband Spectroscopic Ellipsometer (BSE) 18. These five optical measurement devices utilize as few as two optical sources: laser 20 and white light source 22. Laser 20 generates a probe beam 24, and white light source 22 generates probe beam 26 (which is collimated by lens 28 and directed along the same path as probe beam 24 by mirror 29). Laser 20 ideally is a solid state laser diode from Toshiba Corp. which emits a linearly polarized 3 mW beam at 673 nm. White light source 22 is ideally a deuterium-tungsten lamp that produces a 200 mW polychromatic beam that covers a spectrum of 200 nm to 800 nm. The probe beams 24/26 are reflected by mirror 30, and pass through mirror 42 to sample 4.

A fundamental difference between the apparatus described in WO 99/02970 and an embodiment of the present invention is the way in which the processor 48 processes the data from the various measurement systems of the FIG. 1 apparatus. (In addition, as will be evident from the foregoing description, in its broadest form, the embodiment of the invention need not utilize all of the subsystems of the FIG. 1 apparatus.) That is, the present invention extends the concept described in published PCT application WO 99/02970 a step further by utilizing a determination of stress (in a preferred embodiment, from a measurement of angular displacement of the wafer) to optimize the calculations for both stress and thin film parameters (n, k and t).

An initial measurement of stress, through measurement of wafer tilt (bow or warp) can be obtained using the FIG. 1 system. More specifically, in order to maximize the accuracy of the ellipsometer portion of this device, it is important to know with precision the angle between the probe beam and the sample surface. Accordingly, the preferred embodiment is provided with a subsystem such as the stress measurement calibration systems disclosed in U.S. Pat. Nos. 5,134,303 and 5,248,889 which measures the local tilt of the wafer.

Figure 2:
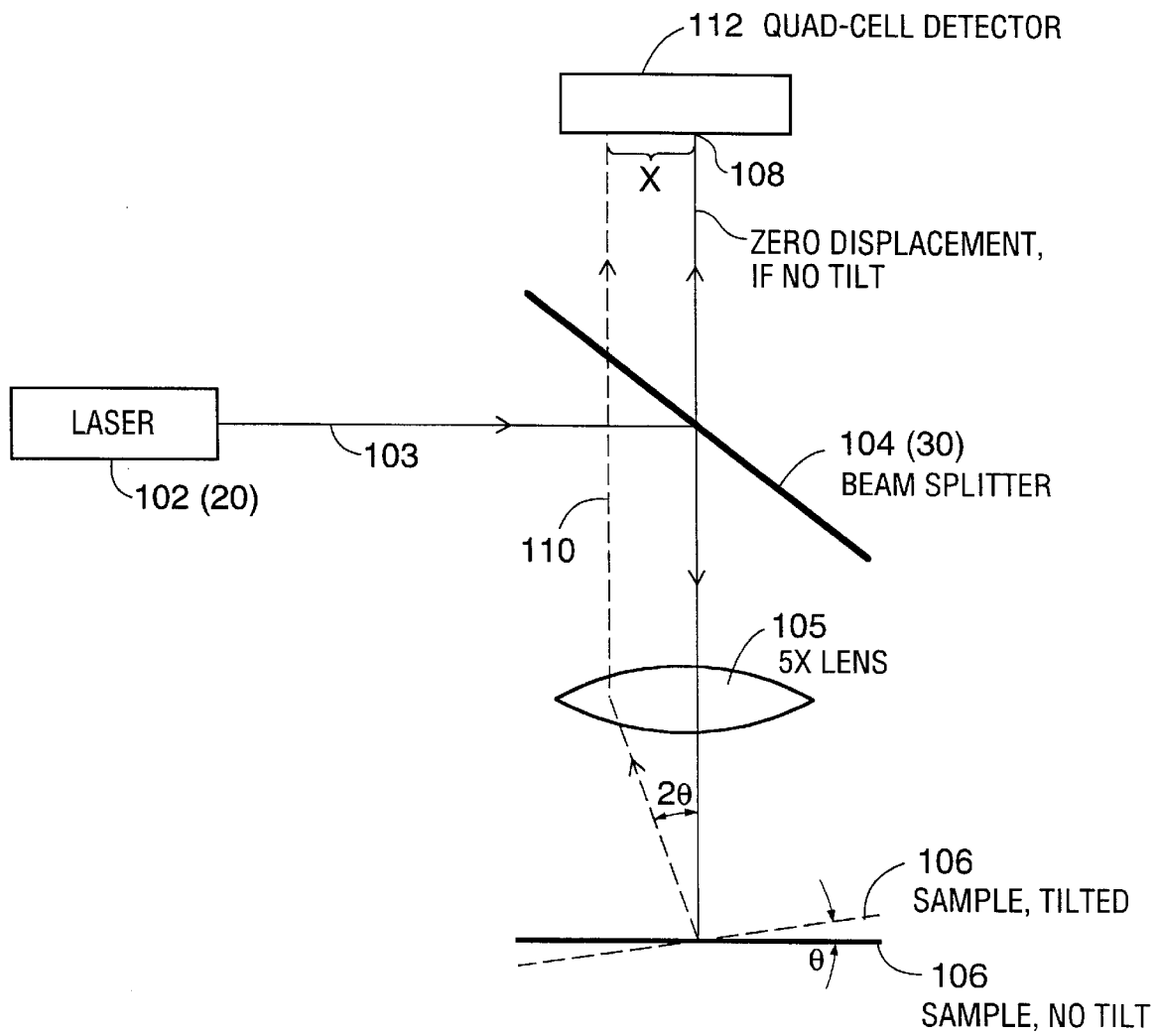
FIG. 2 illustrates a prior art method for determining the local tilt of a wafer.

Referring to FIG. 1 and as described in published PCT application WO 99/02970, the detector/camera 86 is positioned above the mirror 46 to view reflected beams off the sample 4 for alignment and focus purposes. As illustrated more particularly in FIG. 2, the calibration system directs a probe beam 103 via a beam splitter 104 (which is equivalent to the beam splitter 30 in FIG. 1) and lens 105 nominally normal to the surface 106 of the sample. Deviations in the position of the reflected beam 110, due to local sample tilt, are monitored using a position-sensitive photodetector 112 (such as a quad-cell photodetector) as the detector 86 in FIG. 1. Position-sensitive photodetectors are well-known in the art. See, e.g., U.S. Pat. No. 5,134,303 referenced above. Referring still to FIG. 2, the amount "x" the reflected beam 110 is displaced on the photodetector 112 from the location 108 at which the reflected beam would hit the photodetector 112 in the absence of tilt of the sample surface 106 provides information about the tilt of the sample, which is usable to make fine corrections to the ellipsometer system.

Figure 3:
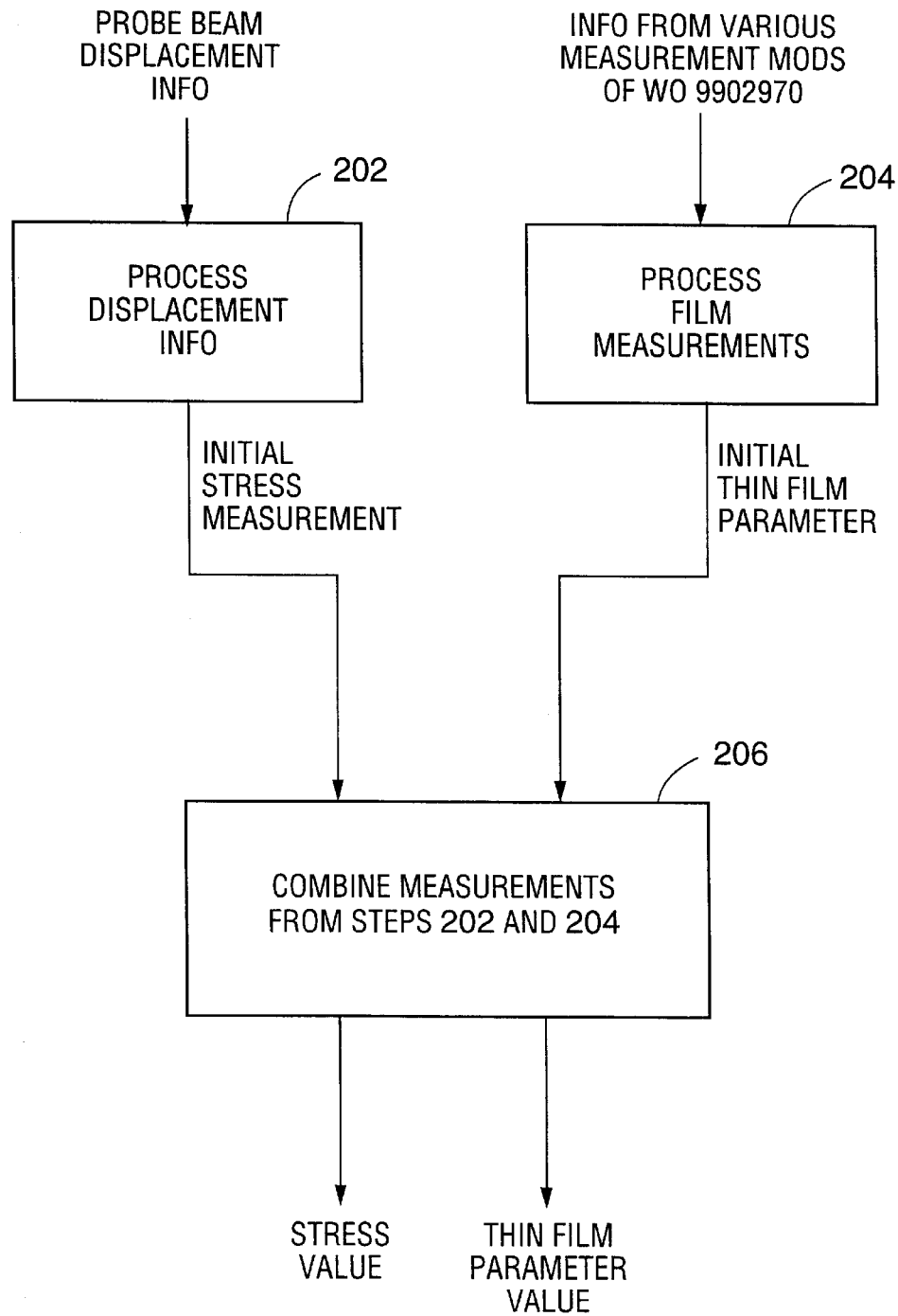
FIG. 3 illustrates a method in accordance with the present invention whereby initial stress and thin film calculated values are combined using optimization techniques.

Referring to FIG. 3, in accordance with an embodiment of the present invention, the local tilt information available from such a stress measurement system as shown in FIG. 2 is used to make an initial determination of stress in the thin film of the wafer. See block 202 of FIG. 3. For example, the amount and direction of the displacement of the probe beam on the detector provides a measure of the wafer surface local slope Θ. The wafer curvature 1/R may be derived from the first derivative of the slope $$1/R = d\Theta/dx, \qquad (1)$$

The film stress σ can be determined from the curvature through the following relationship:

$$\sigma = [Et_s^2/6(1-v)t_f](1/R) \qquad (2)$$

where
   $t_s$=wafer thickness
   $t_f$=film thickness
   E=Young's modulus of the wafer
   v=Poisson's ratio of the wafer.

The accuracy of the stress calculation highly depends on the accuracy of the calculated curvature value.

In order to obtain accurate calculations of the curvature, it is preferred to calibrate/correct the following:
   1) the tilt detection;
   2) the tilt variation introduced by the motion of the x-y stage carrying the wafer;
   3) the nonflatness of the chuck surface if the wafer is supported by a chuck.

Figures 4A, 4B:
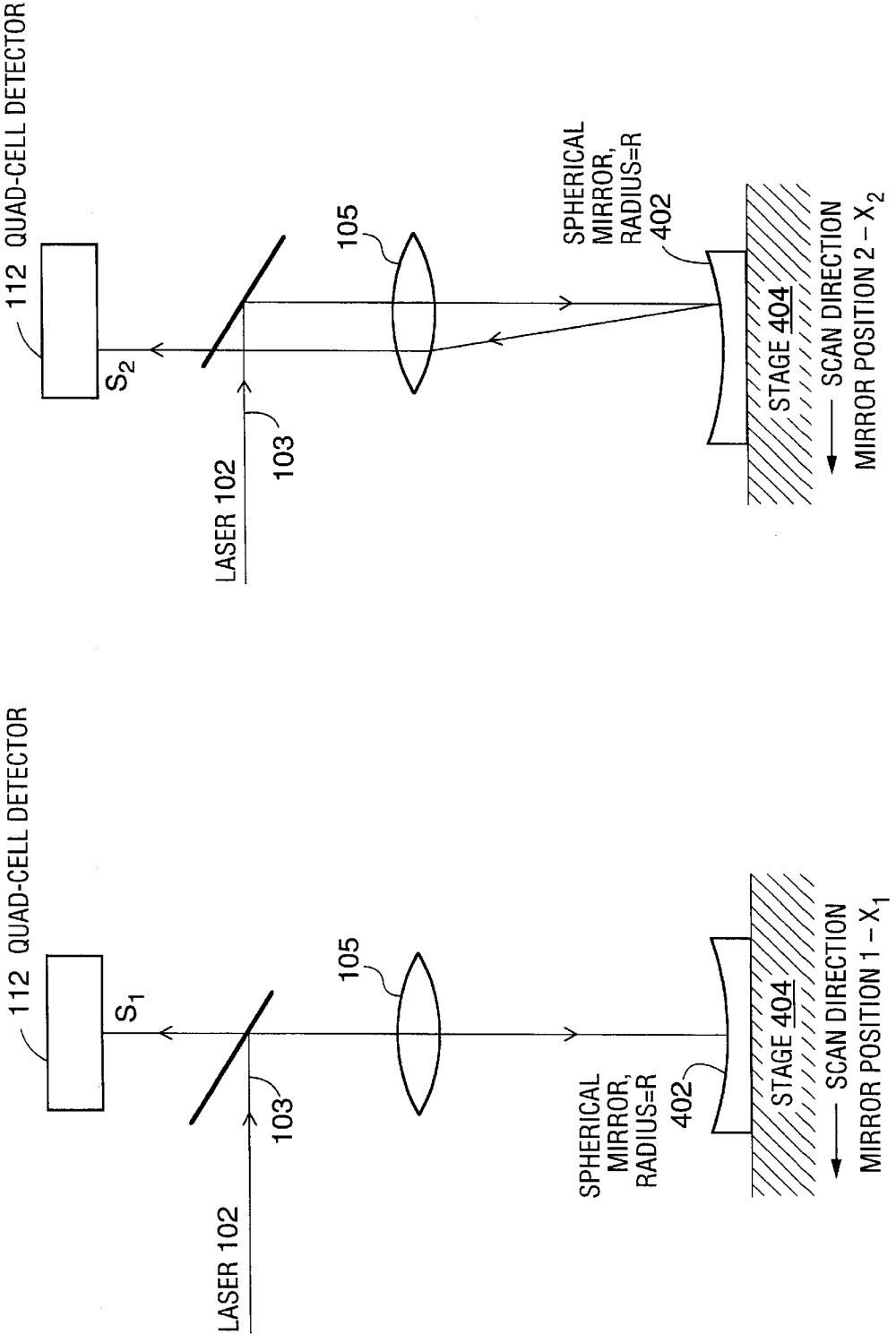
FIGS. 4a and 4b illustrate how to use a spherical mirror to determine a tilt detection system calibration factor.

Referring to FIGS. 4A and 4B, to accurately calibrate the tilt detection system in one embodiment, a spherical mirror 402 made of a relatively large blank with a flat bottom is used. The focal length "f" of such a mirror 402 can be measured with a high degree of accuracy by using conventional approaches. For example, a collimated beam can be directed into the lens and the location of the focal point identified. The distance between the lens and the focal point gives the focal length of the lens. Once the focal length is known, then the radius of curvature R of the mirror can be determined with an equal accuracy since R=2f.

By scanning this mirror 402 along x- or y-direction using the stage 404, a linear relationship is obtained between the tilt sensor signal $S_i$ and the scan distance $d_i$ to determine the calibration figure k. For example, referring to FIGS. 4A and 4B, and taking the x direction first, positions $S_1$ and $S_2$ on the photodetector 112 are determined for respective mirror/stage positions $X_1$ and $X_2$. Then, the x-direction calibration factor $k_x$ is calculated as $$k_x = R \frac{S_2 - S_1}{X_2 - X_1}$$

a similar calculation is made for the y direction calibration factor $k_y$.

Figure 5A:
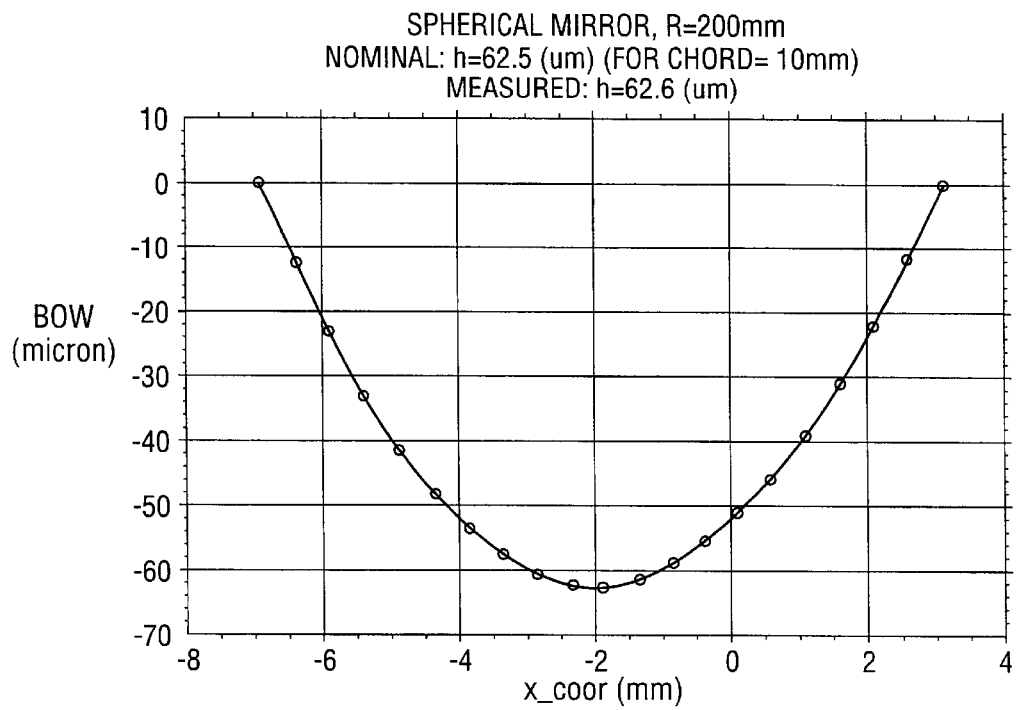
Figure 5B:
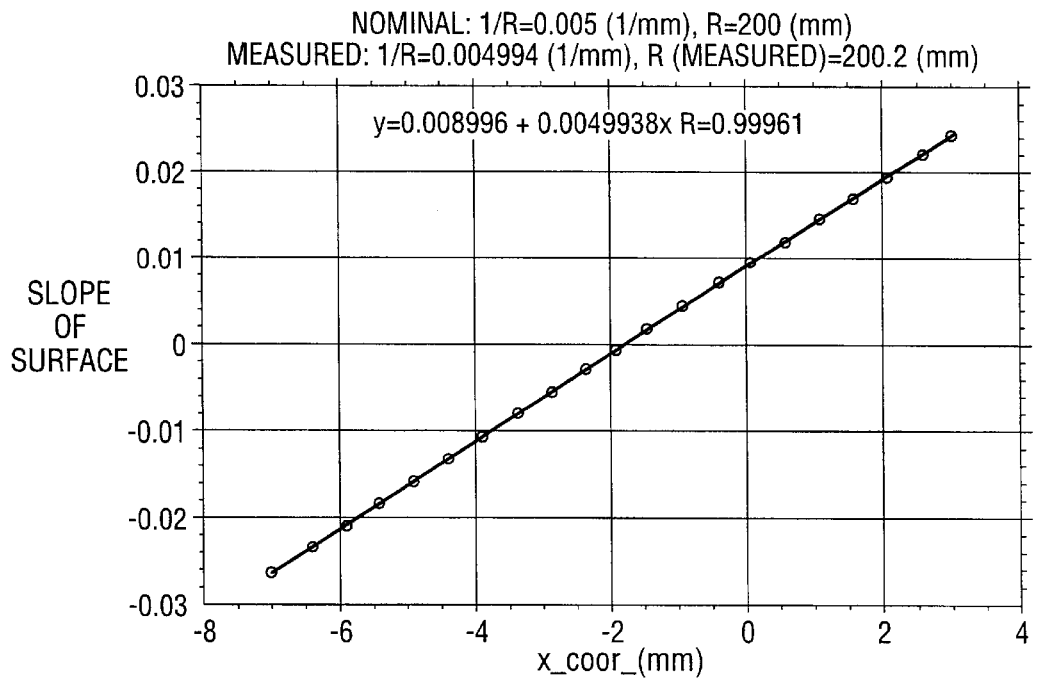
FIG. 5b illustrates how using the calibration factor yields highly accurate tilt measurement results.

Due to the high quality of the spherical mirror (in one embodiment, surface quality λ/4, δR<1% R) and the high precision of the stage motion (in one embodiment, δd<5 μm), the calibration factor $k_i$ is precisely determined. The result of the calibration for one experiment is plotted in FIG. 5a, while FIG. 5b illustrates how an experimental accuracy was achieved within 0.1% (Residual=0.99961) against an R=200 mm mirror.

Figure 6B:
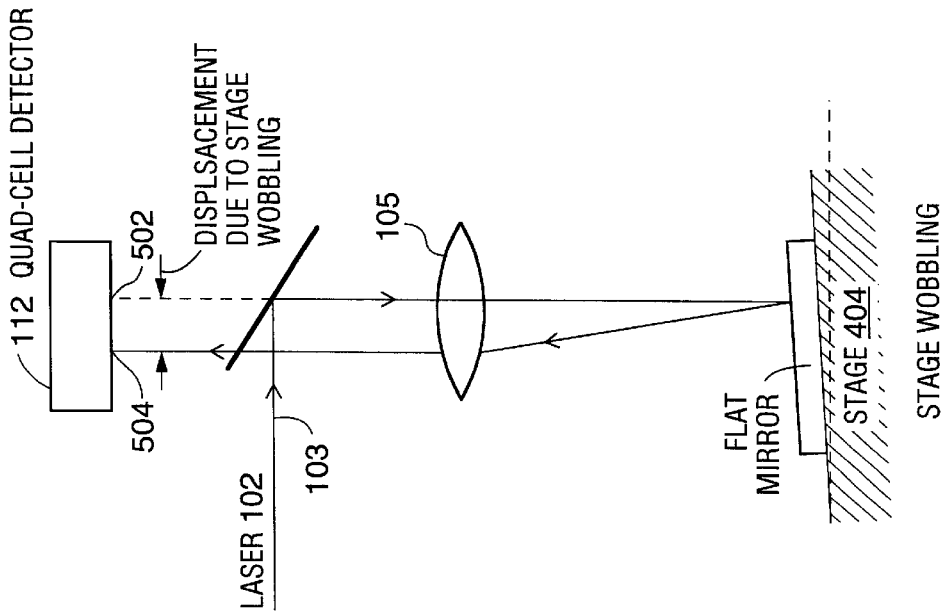
FIGS. 6a and 6b illustrate how to use a flat mirror to determine a stage tilt calibration factor.
Figure 6A:
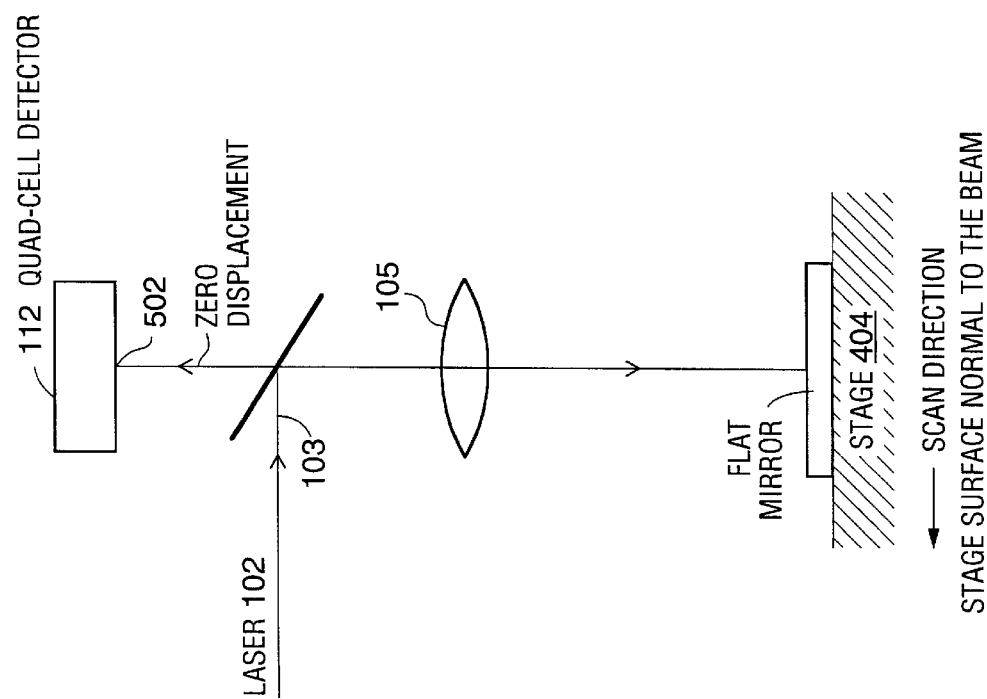

Referring to FIGS. 6A and 6B, calibration of stage tilt variation in one embodiment is performed using a flat mirror whose dimension is comparable to the wafer. Given the flatness of the mirror in the range of λ/4, any tilt variation observed during an x- or y-scan is attributed only to the stage wobbling. In particular, as shown in FIG. 6A, the position of the beam incident to the photodetector 112 is determined for a first "x" position 502 of the stage 404. This position is treated as the "zero displacement". As shown in FIG. 6B, the stage is then shifted in the "x" direction and the position 504 of the beam incident to the photodetector 112 is determined again. The distance between position 502 and position 504 is due to wobbling of the stage 404 and, thus, this displacement is subtracted from any sample tilt "x" direction measurements to compensate for the stage tilt that would otherwise "pollute" the sample tilt "x" direction measurements. A similar stage tilt calibration and compensation procedure is carried out for the "y" direction.

In addition to calibration as just discussed, improper support of the wafer can also impair measurement of wafer tilt, especially for the new, larger 300 mm diameter wafers. Particularly for such 300 mm wafers, gravitational deflection causes bending of the wafer under its own weight. This bending caused by gravity adds to the natural stress-induced bow (or subtracts from a stress-induced warp), introducing artifacts into the stress determination from wafer deflection. For more severely bowed wafers, setting the wafer on a flat chuck top for measurement tends to flatten the shape, reducing the curvature and thus resulting in an under-calculation of the stress. For weakly bowed wafers, the gravity will cause the wafer to conform to the chuck surface, which itself may not even be flat.

Figure 7:
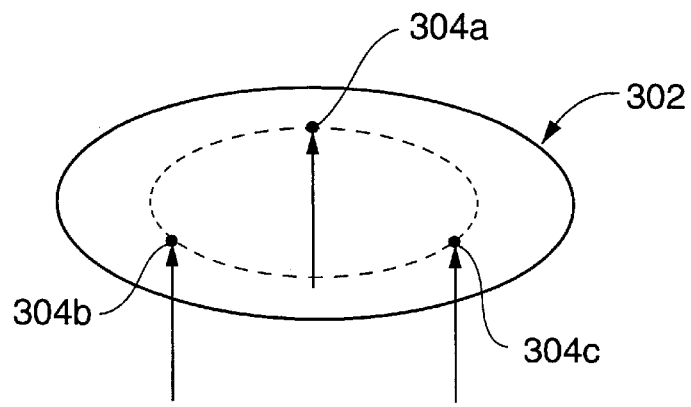
FIG. 7 illustrates a method for supporting a wafer in a gravity-neutral manner.
Figure 8A:
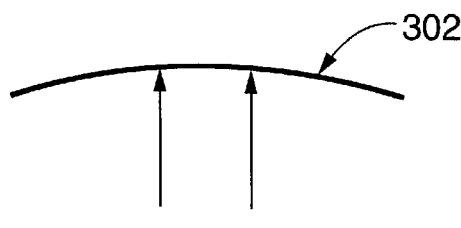
FIG. 8a illustrates the effect of supporting the wafer too close to the center.
Figure 8B:
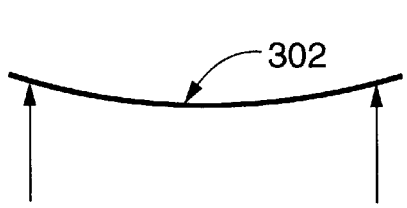
FIG. 8b illustrates the effect of supporting the wafer too close to the edge.
Figure 8C:
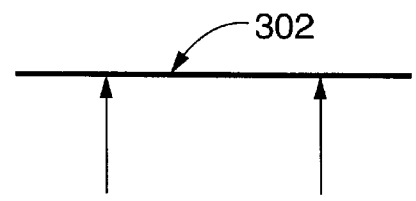
FIG. 8c illustrates how supporting the wafer ⅔ of the way from the center minimizes gravity-induced change in the shape of the wafer.

In accordance with an embodiment of the invention, the wafer is supported in a way such that the effects of gravity on wafer shape are minimized. As shown in FIG. 7, rather than place the wafer 302 on a flat chuck top, the wafer 302 is supported at three points 304a, 304b and 304c. By proper placement of the three support points, gravity-induced change in the shape of the wafer 302 is minimized, at least to first order. See FIG. 8c. If the support points are placed too close to the center of the wafer 302, the edge of the wafer 302 will tend to sag under its own weight. See FIG. 8a. If the support points are placed too far from the center of the wafer 302, the center of the wafer 302 will sag under its own weight. See FIG. 8b.

Calculation of the optimal location for the wafer support points is now discussed. From simple symmetry arguments, it can be inferred that the pins should be evenly distributed in circumference by 120°. The optimum radial location comes from balancing the bending moments inside and outside the support radius. Assuming the wafer is a circular plate of uniform thickness, t, and density, ρ, then $$M(r > r_0) = 2\pi \rho t \int_{r_0}^{R} (r - r_0) r dr$$

and $$M(r > r_0) = 2\pi \rho t \int_{r_0}^{0} (r - r_0) r dr$$

The equilibrium condition requires M (r>$r_0$)=M (r<$r_0$), which gives $r_0$=(2/3)R. Other configurations may be possible as long as the support achieves the result of minimizing the effect of gravity inducing changes in curvature of the wafer during a measurement of the inherent curvature of the wafer. In this manner, more accurate measurements of stress can be obtained.

Figure 9A:
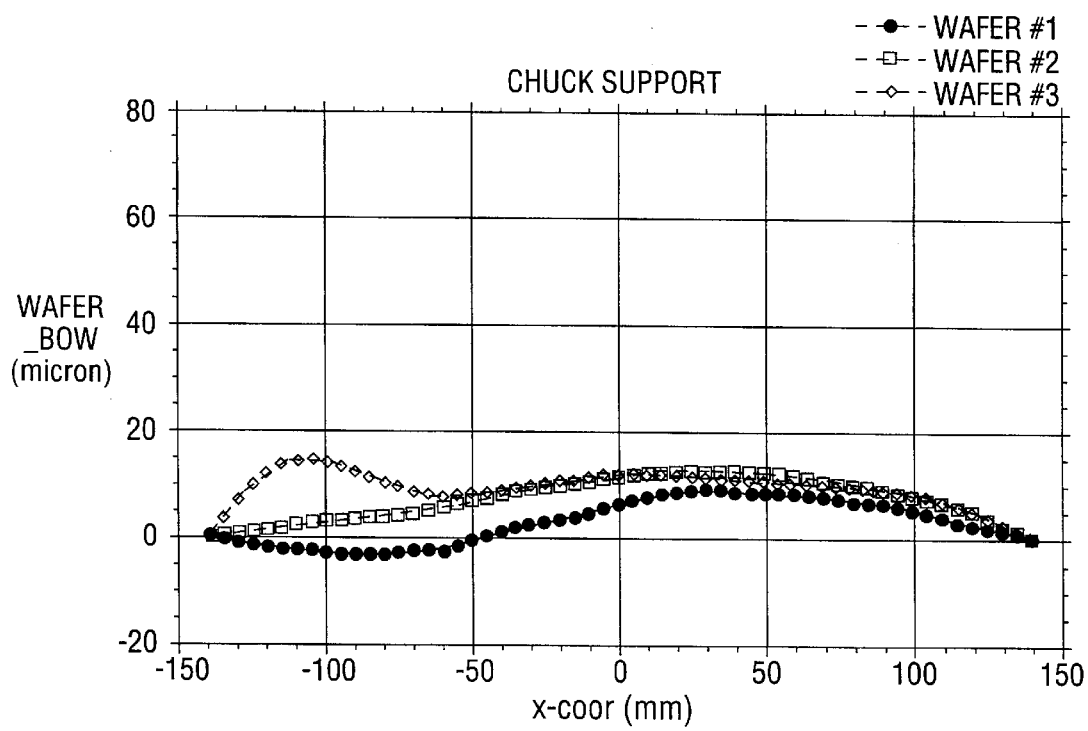
FIG. 9a illustrates stress measurements of three differently-stressed wafers supported on a conventional support.
Figure 9B:
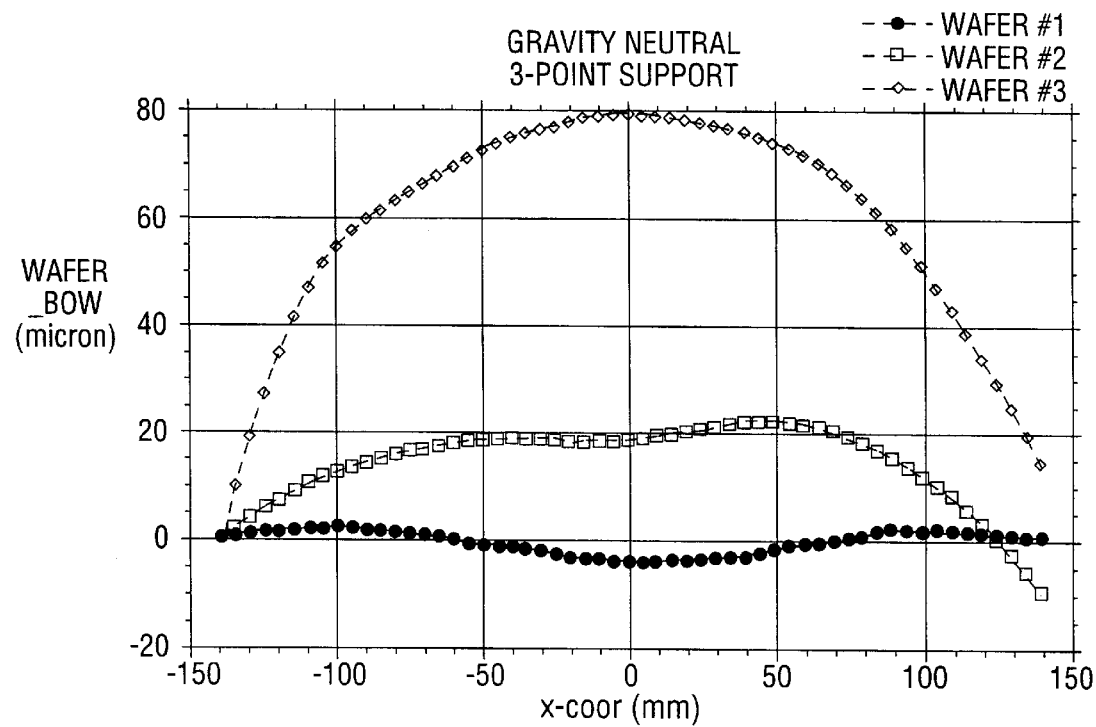
FIG. 9b illustrates stress measurements on the same three differently-stressed wafers, supported in a gravity-neutral manner.

FIGS. 9a and 9b illustrate the measured bow of three differently-stressed 300 mm wafers. The plots in FIG. 9a show measurements of wafer bow obtained for three wafers supported by a conventional support, while FIG. 9b shows measurements of wafer bow obtained for the same three wafers supported by a gravity-neutral wafer support. As can be seen from FIG. 9a, without the gravity neutral wafer support, the measurements for the three differently-stressed wafers are nearly indistinguishable, while FIG. 9b shows the differences in wafer bow measurement obtained with the gravity-neutral wafer support.

The gravity-neutral wafer support has particular utility for large size wafers. Wafers that are 200 mm in diameter are far stiffer than 300 mm wafers as the diameter of 200 mm wafers is far smaller than that of 300 mm wafers, but the thickness of the 200 mm wafers is comparable. For 200 mm wafers which are moderately stressed, one could generally still distinguish bow and warp even without the gravity-neutral support system, but the measured values would be slightly inaccurate.

It should be noted that the effects of gravity induced stress on silicon wafers is known in the art. (For example, see "Scaling Wafer Stresses and Thermal Processes to Large Wafers," Nilson and Griffiths, *Thin Solid Films*, V. 315, pages 286–293, 1998, incorporated herein by reference.) In this article, it is suggested that wafer supports be used to minimize gravity induced stresses in wafers during processing. In the present disclosure, similar wafer supports are proposed for use when measuring stresses in thin films so that the measurement will not be affected by stresses induced by gravity.

Turning again to FIG. 3, in addition to the step 202 for determining an initial stress measurement from probe beam displacement information, at step 204 information about local measurements of thin film parameters is determined using one or more of the various measurement modules described in the WO 99/02970 publication. As discussed, the tilt measurements are used to determine a likely level of stress in the film and the effect of that stress on the index of refraction and/or birefringence. The measurements from the thin film monitor modules (which can include the spectrophotometer, ellipsometer, and multiple angle of incidence devices) provide initial information about the parameters t, n, k and birefringence.

There are a number of possible approaches for combining the data at step 206. For example, once all the data is collected, the processor can use the data from the optical measurement modules to determine the characteristics of the thin film (i.e. thickness, index of refraction and extinction coefficient) in the conventional manner. Thereafter, the processor can calculate stress based on the bow and warp measurements. However, in this calculation, the "thickness" used in the stress calculation will be based on the calculated thickness, rather than on an assumed thickness. In this way, errors in the stress calculation which might arise if the thickness was simply assumed to be a known quantity can be minimized.

Alternatively, the processor can first use the bow and warp measurement module to determine the level of stress in the film. The results of this measurement can be supplied as a known parameter (i.e. level of birefringence) to the subsequent determination of the characteristics of the thin film based on the data obtained from the optical measurements. In this way, optical artifacts such a birefringence can be considered.

In a preferred embodiment, at step 206, all of the data is combined in a single algorithm which seeks the best fit of the data to both stress measurements and thin film parameters (t, k & n), such as an optimization algorithm. Such optimization routines utilize Fresnel equations in an iterative process (such as a least squares fitting routine) to provide an optimal solution for both stress and thin film parameters. One example of this type of optimization routine is described in "Multiparameter Measurements of Thin Films Using Beam-Profile Reflectivity," Fanton, et. al., Journal of Applied Physics, Vol. 73, No. 11, p.7035, 1993. Another example appears in "Simultaneous Measurement of Six Layers in a Silicon on Insulator Film Stack Using Spectrophotometry and Beam Profile Reflectometry," Leng, et. al., Journal of Applied Physics, Vol. 81, No. 8, page 3570, 1997.

The subject invention is not limited to the particular algorithm used to derive the characteristics of the thin film. In addition to the more conventional least square fitting routines, alternative approaches can be used. For example, the high level of computing power now available permits approaches to be utilized which include genetic algorithms. One example of the use of genetic algorithms to determine the thickness of thin film layers can be found in "Using Genetic Algorithms with Local Search for Thin Film Metrology," Land, et. al., Proceeding of the Seventh International Conference on Genetic Algorithms, July 19–23, page 537, 1997. These routines can be expanded to include a concurrent optimization of the determination of the level of stress in the thin film as well as the parameters t, n and k based on the multiple measurements.

The subject invention is not limited to the combination measurement device described in WO 99/02970. Rather, the subject invention can be implemented in any combination device which calculates stress value (based on a measurement of wafer deformation or otherwise) and which also determines optical parameters such as t, n and k through optical measurements of a type that would be affected by stress. By combining measurements from both systems, a more accurate analysis of the sample can be obtained.

The combination of the optical measurement modules and a stress measurement module in a single tool, in addition to providing more accurate results, provides economic benefits as well. For example, a single tool has a smaller footprint and therefore takes up less space in the semiconductor fab. By combining technologies in a single tool, costs can be reduced by eliminating duplicate subsystems such as wafer handlers and computers. Furthermore, the combination can simplify and streamline decision making since the information from the two measurement modalities can be coordinated instead of producing conflicting results as in the prior art when two separate devices might be used. It should be noted, however, that while the preferred embodiment coordinates the data from the optical measurement module and the stress measurement module in the single tool, the invention is not so limited. Furthermore, in embodiments where the optical measurement data and the stress data are coordinated, the processor or other circuitry that coordinates the measurements may be "on-board" as shown in FIG. 1, the processor may be networked, or the processor may even be off-line.

What is claimed is:

1. A method of analyzing the characteristics of a thin film on a semiconductor wafer comprising the steps of:

directing a first probe beam of radiation to reflect off the wafer surface;

measuring the change in magnitude or polarization of the reflected probe beam induced by the interaction with the wafer and generating first signals responsive thereto;

directing a second probe beam of radiation to reflect of the wafer;

measuring the angular deviation of the reflected probe induced by the interaction with the wafer and generating second signals responsive thereto;

analyzing the first and second signals in order to determine characteristics of the wafer including the thickness of the film and the stress in the film.

2. The method of claim 1, wherein the first probe beam and the second probe beam are generated by the same source.

3. The method of claim 1, wherein the analyzing step utilizes an optimization algorithm to combine the first and second signals.

4. The method of claim 1, wherein the angular deviation measuring step includes accounting for a tilt detection system calibration factor.

5. The method of claim 4, wherein the wafer rests on a movable stage, and wherein the tilt detection system calibration factor has been determined by:

resting a spherical mirror on the stage in place of the wafer;

directing a probe beam to the spherical mirror;

moving the stage and, at a plurality of positions of the stage, determining the angle between the probe beam and the reflection of the probe beam; and determining a relationship between the positions and the determined angles, whereby the relationship is the tilt detection system calibration factor.

6. The method of claim 1, wherein the wafer is resting on a stage, and wherein the angular deviation measuring step includes accounting for a stage tilt calibration factor.

7. The method of claim 6, wherein the stage tilt calibration factor has been determined by:

resting a flat mirror on the stage in place of the wafer;

directing the probe beam to the flat mirror;

moving the stage and, at a plurality of positions of the stage, determining the angle between the probe beam and the reflection of the probe beam; and determining a relationship between the positions and the determined angles, whereby the relationship is the stage tilt calibration factor.

8. The method of claim 1, wherein the step of determining the angular deviation of the reflection of the second probe beam includes:

directing the second probe beam to be nominally normal to the thin film;

detecting a deviation of the reflection of the second probe beam; and determining the angle based on the deviation.

9. The method of claim 8, wherein the step of detecting the position of the reflection of the second probe beam includes determining relative intensities of the portions of the reflected second probe beam on a plurality of cells of a photodetector.

10. The method of claim 2, wherein the analyzing step includes applying optimization routines used to solve Fresnel equations in an iterative process.

11. The method of claim 10, wherein the iterative process includes a least squares fitting routine.

12. The method of claim 1, wherein the analyzing step includes applying a genetic algorithm to concurrently optimize the determination of the stress as well as the thickness.

13. The method of claim 1, wherein the method further comprises:

initially supporting the wafer only at points substantially two-thirds of the distance from the center of the wafer.

* * * * *